United States Patent

Brown et al.

[11] Patent Number: 5,954,067
[45] Date of Patent: Sep. 21, 1999

[54] METHOD FOR WASHING CORES OF CORED LETTUCE HEADS

[75] Inventors: Richard S. Brown, Chualar; Eugene D. Rizzo, Pacific Grove, both of Calif.

[73] Assignee: Fresh Express, Inc., Salinas, Calif.

[21] Appl. No.: 09/234,152

[22] Filed: Jan. 19, 1999

Related U.S. Application Data

[62] Division of application No. 09/144,792, Sep. 1, 1998.
[51] Int. Cl.⁶ ......................................................... B08B 3/02
[52] U.S. Cl. .................... 134/25.3; 134/22.1; 134/22.18; 134/22.19; 134/23; 134/25.3; 134/133; 134/166 R; 134/169 R; 426/335
[58] Field of Search ............................... 134/22.1, 22.18, 134/22.19, 23, 25.3, 133, 166 R, 169 R; 426/324, 334, 335, 392, 442

[56] References Cited

U.S. PATENT DOCUMENTS

| | | | |
|---|---|---|---|
| 4,168,597 | 9/1979 | Cayton | 53/127 |
| 4,962,777 | 10/1990 | Bell | 134/63 |
| 5,121,589 | 6/1992 | Ventura et al. | 53/448 |
| 5,316,778 | 5/1994 | Hougham | 426/324 |
| 5,421,250 | 6/1995 | Beaumont | 99/636 |
| 5,727,690 | 3/1998 | Hofmeister | 209/139.1 |

*Primary Examiner*—Jill Warden
*Assistant Examiner*—S. Carrillo
*Attorney, Agent, or Firm*—Patrick F. Bright

[57] ABSTRACT

A method for washing a cored head of lettuce includes placing the head in a position such that the cored hole faces downwardly, spraying an aqueous solution upwardly into the cored hole for a time and at a pressure sufficient to wash the hole, and then propelling the cored washed lettuce head upwardly from the washing position onto a conveyor for the lettuce head with minimal damage to that head.

9 Claims, 7 Drawing Sheets

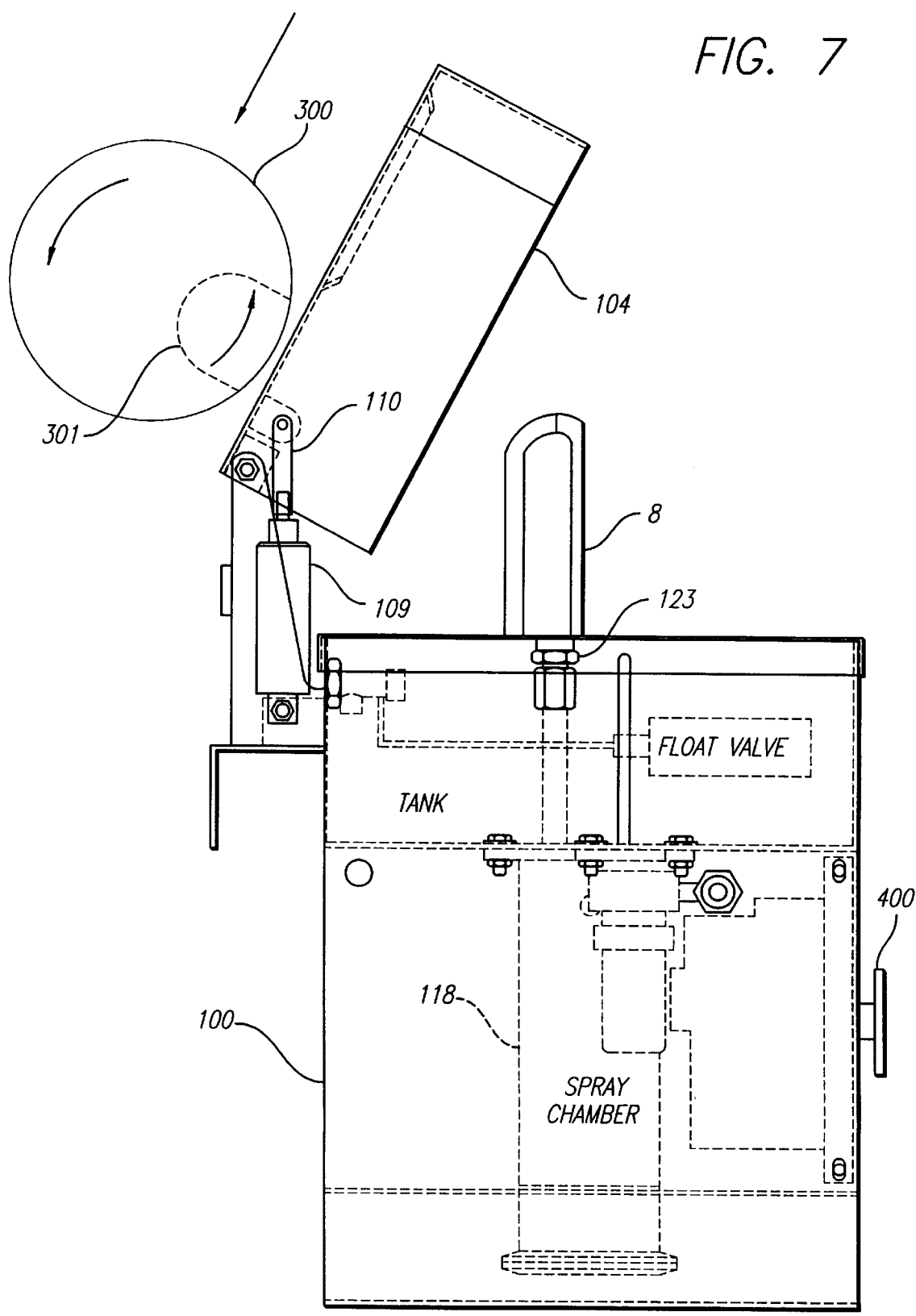

METHOD FOR WASHING CORES OF CORED LETTUCE HEADS

This appliaction is a division of copending U.S. patent application Ser. No. 09/144,792, filed Sep. 1, 1998.

This invention relates to an apparatus and methods for washing the cored area of a lettuce head.

These apparatus, in preferred embodiments, include a perforated platform, preferably a perforated platform, connected to and supporting a tripod, or other lettuce head guide, that fits into the core hole of a cored lettuce head, and orients the lettuce head during washing of the core hole. Preferably, the guide includes three L-shaped vanes that project upwardly from the support platform.

In preferred embodiments, a support platform includes supports for a lettuce head holder. This holder has an opening sufficiently large to permit the guide to project through the opening with the holder in a first position over the guide. The opening in the holder includes, near the top of the holder, a recess, preferably of sufficient size and shape to receive and support a cored head of lettuce. In the first position, the core hole of a lettuce head is placed over the guide and into the recess of the holder, with the lettuce head otherwise resting in the recess of the holder.

The holder is pivotally connected to two holder supports. The two holder supports are connected to the support platform so that the holder can move upwardly from the first, preferably horizontal position, where the guide projects through the opening in the holder, to a second raised position at a distance of 45° to 75° from the first position. This movement to a second position unseats the cored area of the lettuce head from the guide and propels the lettuce head onto a conveyor that carries the cored, washed lettuce head from the washing apparatus.

Below the perforated platform is a housing for a chamber that stores and dispenses aqueous, lettuce head washing solution. Inside this chamber is an inlet valve through which such a solution enters the chamber. This inlet valve is connected to a float mechanism. The inlet valve maintains a predetermined, adjustable level, usually at or near the middle of the chamber.

Inside the chamber are a screen and screen housing through which the aqueous solution exits the chamber and flows, via lines and valves, into a pressurizable chamber. At least one valve is a check valve that prevents the aqueous solution from escaping the pressurized chamber, and flowing upstream toward the screen and screen housing. Inside the pressurized chamber is a syphon, preferably of cylindrical shape, with an opening at a distal end near the bottom of the pressurizable chamber. Aqueous solution enters the syphon from this distal end, and flows, under pressure, upwardly toward a nozzle at the proximal end of the syphon. The pressurized chamber also includes an opening for admitting a pressurizing gas such as air into the chamber. In preferred embodiments, the nozzle at the proximal end of the syphon discharges a spray of aqueous solution upwardly into and through the area within the guide, and into and around the cored area of a lettuce head to wash the head efficiently.

The washing apparatus also includes pressure driven timers. These timers control the time for aqueous solution to exit the chamber and flow into the pressurizable chamber; start and stop the flow of pressurizing air or other gas into the pressurizable chamber; initiate and sustain the spray from the nozzles into the area with the guide and into the core hole of a cored lettuce head placed on the guide; control the time for ejecting the cored lettuce head; and control the time delay between one wash cycle and another.

BRIEF DESCRIPTION OF THE DRAWINGS

FIG. 7 shows the apparatus of FIG. 6 propelling the cored lettuce head, after washing of the core hole as shown in FIG. 6, onto a suitable conveyor (not shown).

DETAILED DESCRIPTION OF THE DRAWINGS

Figure 1:
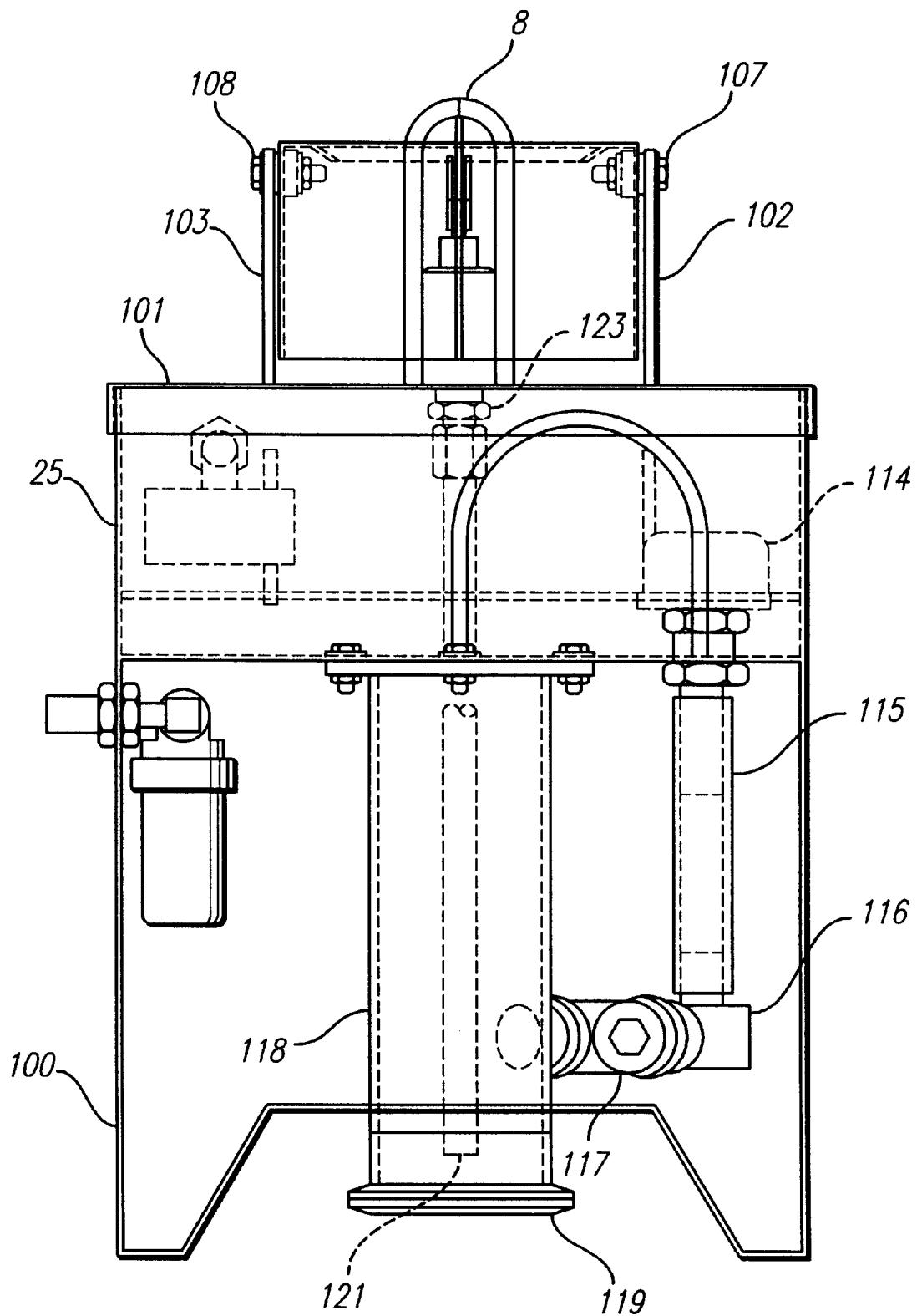
FIG. 1 shows an end elevation view in cross-section of a preferred embodiment of the cored lettuce head washing apparatus of this invention.
Figure 2:
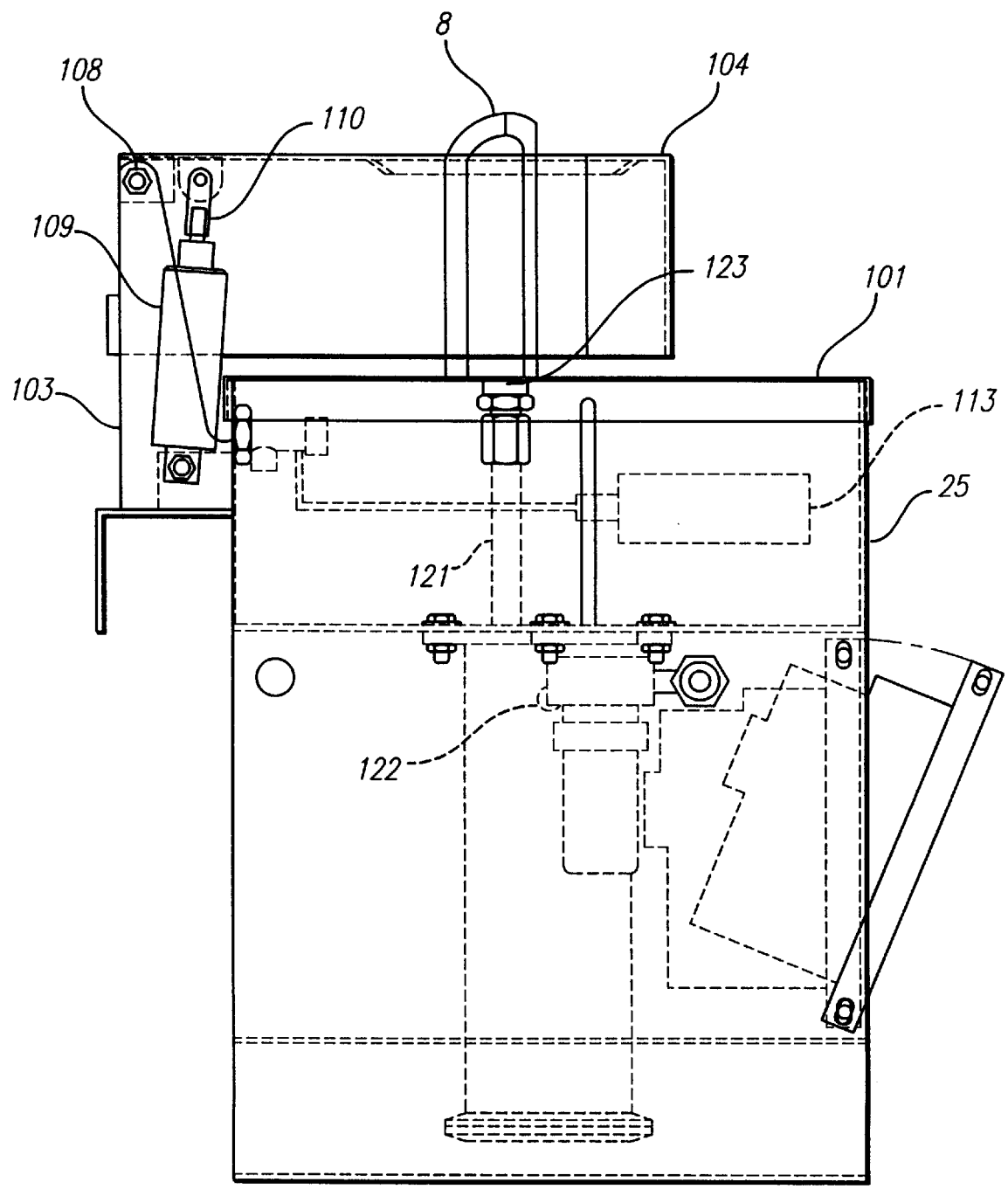
FIG. 2 is a side elevation view in cross-section of the cored lettuce head washing apparatus shown in FIG. 1.

FIG. 1 shows lettuce head washing apparatus 100. Apparatus 100 includes perforated platform 101 that supports, and is connected to guide 8. Guide 8 includes three L-shaped vanes, that project upwardly from platform 101.

Figure 3:
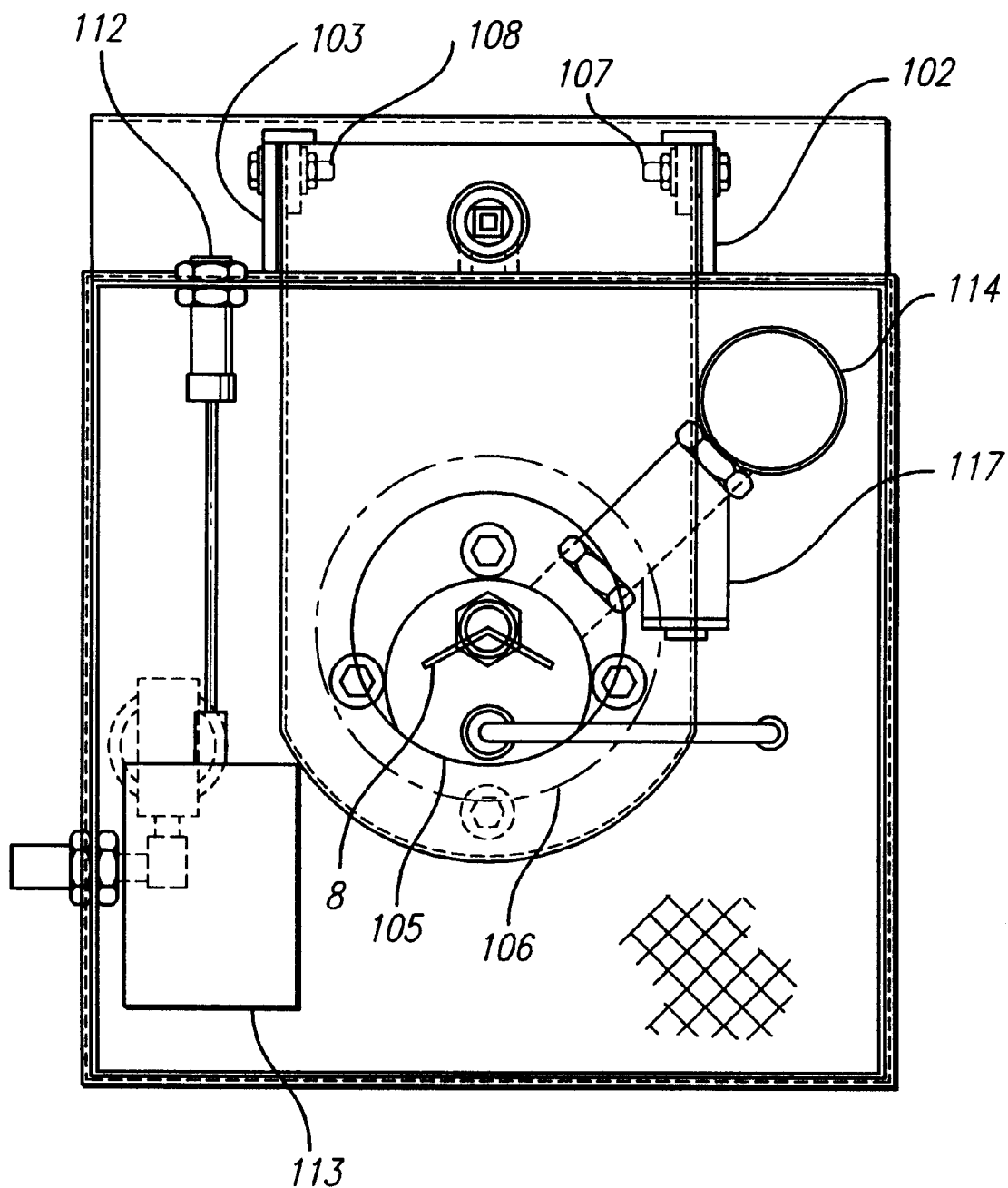
FIG. 3 is a top plan view of the cored lettuce head washing apparatus shown in FIGS. 1 and 2.

Also attached to washing apparatus 100 are supports 102 and 103 for platform 104. Platform 104 includes opening 105 (see FIG. 3) sufficiently large in diameter to permit guide 8 to project through opening 105 with platform 104 in the horizontal position shown in FIG. 1. Opening 105 includes, near the top of platform 104, recess 106. Recess 106 is of sufficient depth and size to receive and support a cored head of lettuce when the core hole is placed over guide 8 with the balance of the lettuce head resting in recess 106.

Platform 104 connects to supports 102 and 103 with pivots 107 and 108 and is moveable upwardly from the horizontal position shown in FIG. 1 to a second position, as shown in FIG. 7. Pneumatic piston 109 is connected by rod clevis 110 to platform 104, and can move platform 104 from the position shown in FIG. 1 to the position shown in FIG. 7.

Below platform 101, and supporting platform 101, is chamber 25. Inside chamber 25 is valve 112 through which such a solution enters chamber 25. Valve 112 is connected to float mechanism 113, and opens when float 113 drops to a predetermined, adjustable level, usually at or near the middle of chamber 25. Chamber 25 also includes screen and screen housing 114. Aqueous solution in chamber 25 passes through screen housing 114, line 115, fitting 116 and check valve 117 into chamber 118. Chamber 118 includes bottom closure 119.

Inside chamber 118 is syphon 121. Chamber 118 and syphon 121 receive aqueous solution via line 115, fitting 116 and check valve 117. Pressurizing air enters chamber 118 through opening 122 via an air pressurizing line (not shown). As the air pressure increases in chamber 118, the aqueous solution in chamber 118 moves downwardly in chamber 118 and upwardly through syphon 121, and nozzle 123, then sprays upwardly into the area inside guide 8.

Figure 4:
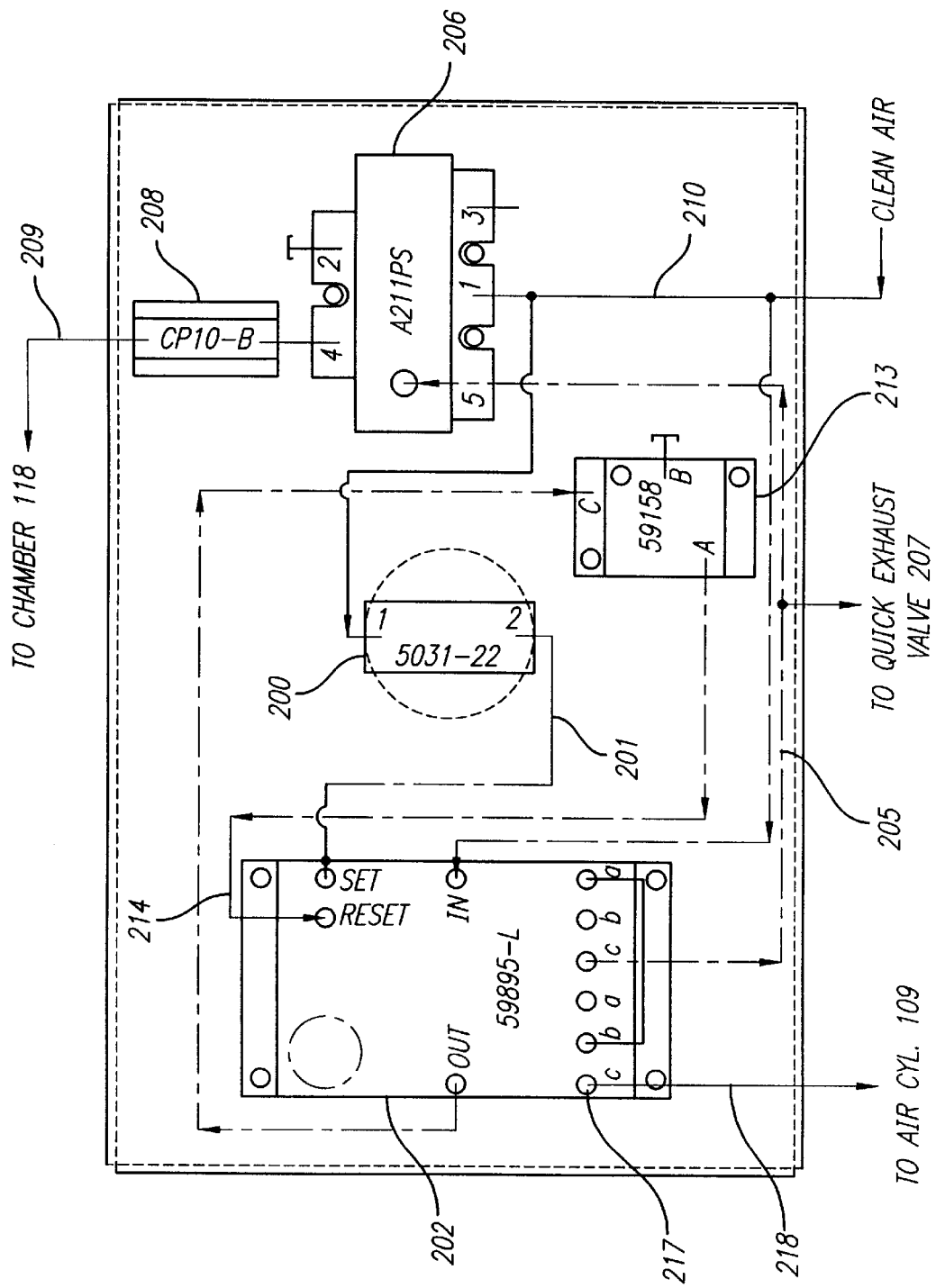
FIG. 4 is a schematic of a preferred embodiment of an air pressurizing system for the apparatus of FIGS. 1 to 3.

FIG. 4 shows a schematic of the air pressure system that operates aqueous wash apparatus 100. When a user pushes the momentary start button 400, switch 200 is activated. Switch 200 delivers an air pressure signal on line 201 to timer 202. Another air pressure signal then passes via line 205 to, and activates valve 206, and valve 207. Input Air (line 210) passes through check valve 208 and line 209 to chamber 118. After chamber 118 is pressurized, and the aqueous solution in chamber 118 is sprayed through nozzle 123 into the core hole of a cored lettuce head for a time determined by timer 202, air supply to chamber 118 ceases. After timer 202 times out, input air pressure is delivered through regulator valve 217 via line 218 to air cylinder 109 to move platform 104, propelling a cored lettuce head onto a conveyor (not shown). After a predetermined time passes, an air pressure signal from timer 213 passes to reset timer 202 and deactivate air cylinder 109 via line 214.

Figure 5:
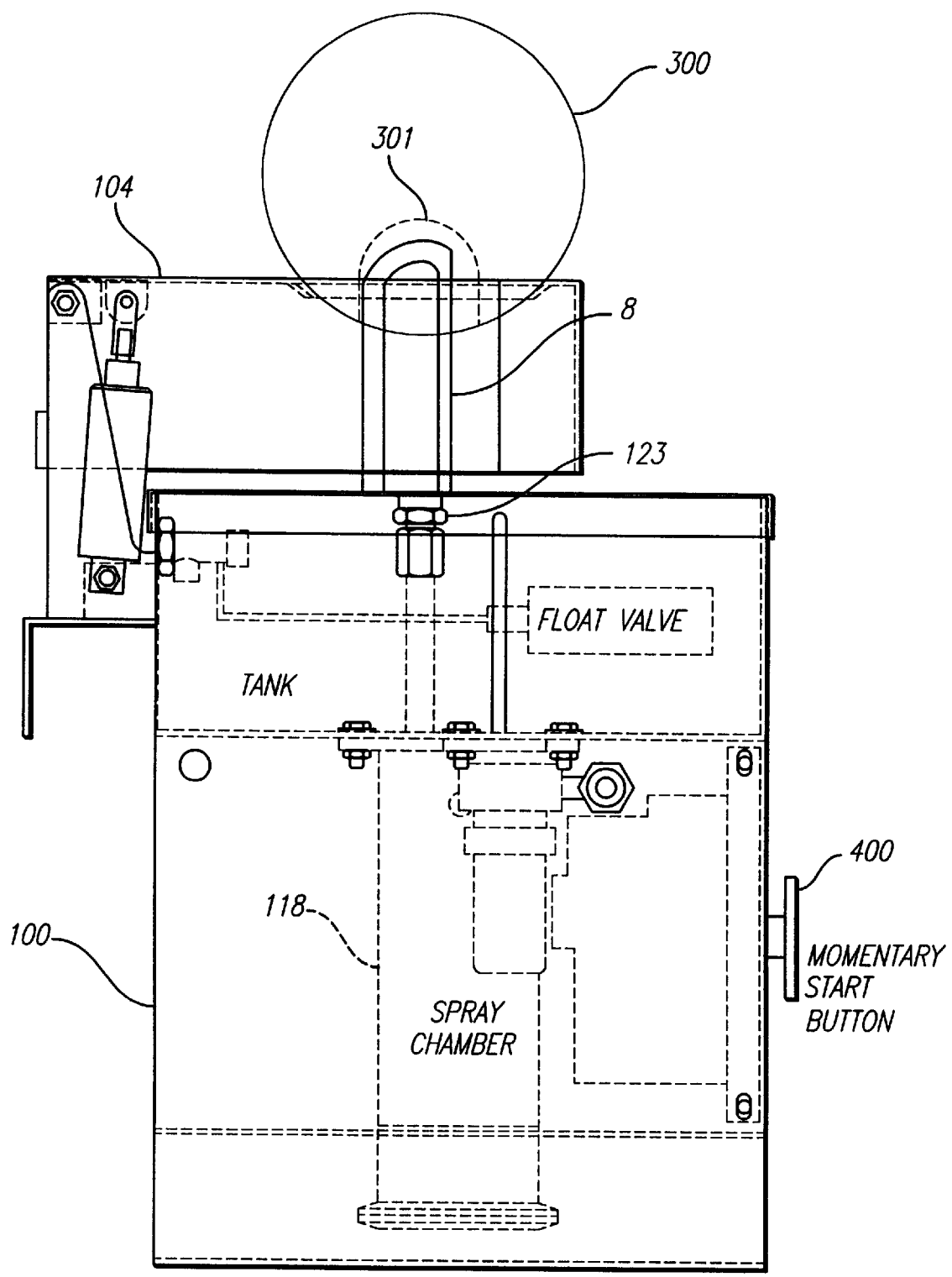
FIG. 5 shows the apparatus of FIGS. 1 through 4 with a cored lettuce head in place, ready for washing.
Figure 6:
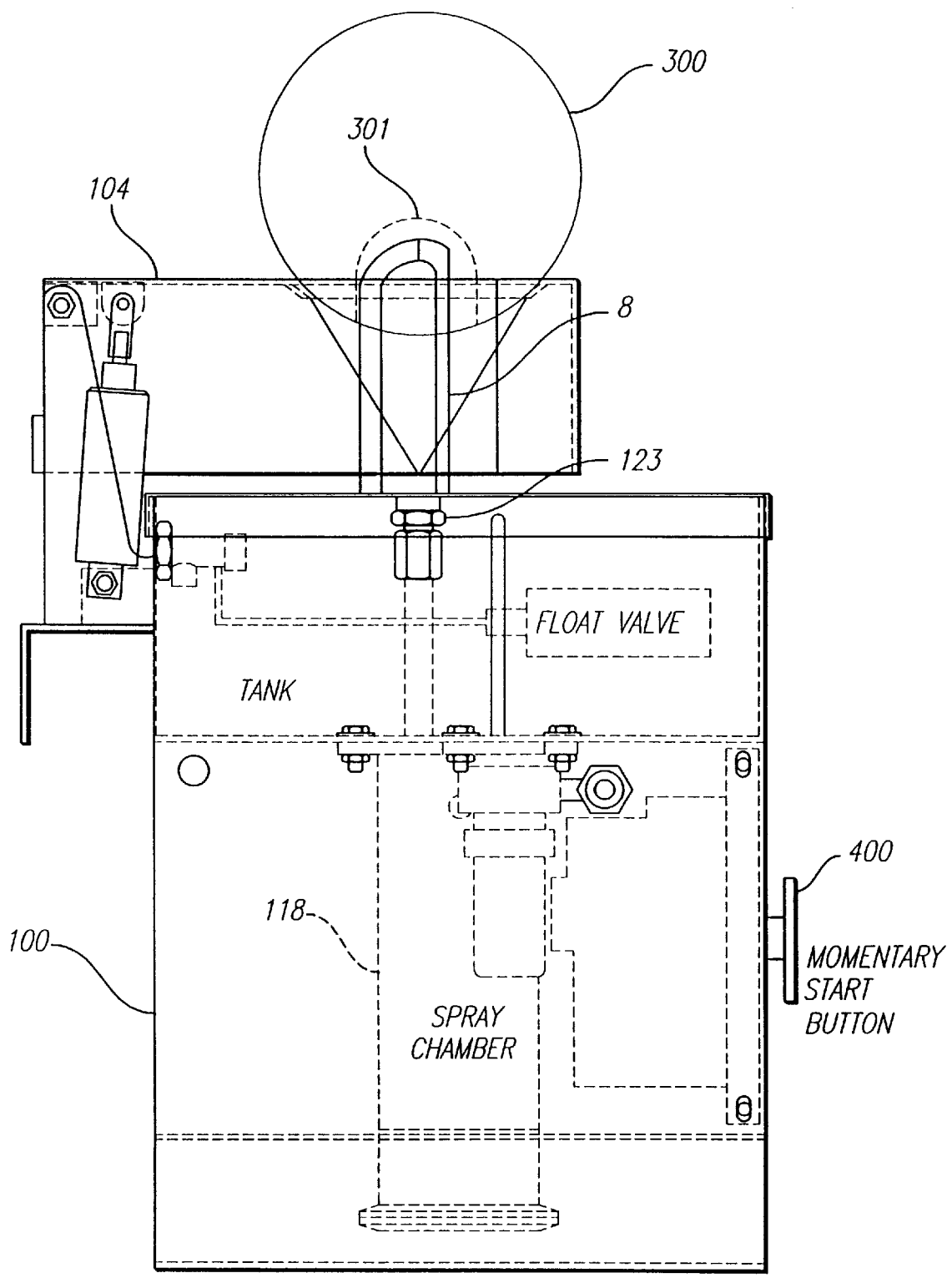
FIG. 6 shows the apparatus of FIG. 5, with an aqueous liquid washing spray passing upwardly into, and washing, the cored hole of the lettuce head shown in FIG. 5.

FIGS. 5, 6 and 7 show the sequence of operations in the washing of a cored lettuce head 300 by apparatus 100. FIG. 5 shows cored lettuce head 300 placed on guide 8 with core hole 301 atop guide 8. In FIG. 6, an aqueous solution from chamber 118 is sprayed through nozzle 123 into lettuce core hole 301. In FIG. 7, platform 104 moves upwardly as the rod clevis 110 connected to piston 109 moves upwardly to deliver lettuce head 300 onto a suitable lettuce head conveyor belt.

What is claimed is:

1. A method for washing a cored head of lettuce comprises placing said cored lettuce head in a position such that the cored hole faces downwardly;

spraying an aqueous solution upwardly into said cored hole for a time and at a pressure sufficient to wash said cored hole; and propelling said cored lettuce head upwardly from said position onto a conveyor for said cored lettuce head with minimal damage to said cored lettuce head.

2. The method of claim 1 further comprising pressurizing said aqueous solution in a chamber below said position, and delivering said solution under pressure from said chamber upwardly into said lettuce head cored hole.

3. The method of claim 1 or claim 2 wherein said placing step comprises seating said cored lettuce head on a lettuce head guide that fits snugly into said cored hole and that provides a path for said aqueous solution to enter and to wash said cored hole.

4. The method of claim 1 or claim 2 further comprising providing a chamber for said aqueous solution and providing a pressurizing medium to said chamber to pressurize said aqueous solution in said chamber and to propel said aqueous solution upwardly into said cored hole.

5. The method of claim 3 further comprising providing a moveable platform that fits over said lettuce head guide in a first position with said guide projecting through and above said platform, said platform including, in the area that surrounds said guide, a recess for holding said cored lettuce head, said platform moving upwardly during said propelling step to a second position wherein said cored lettuce head is propelled onto said conveyor.

6. The method of claim 5 further comprising providing a piston connected to said platform and to a pressurizing gas source, to move said platform to said second position.

7. The method of claim 5 further comprising providing a piston connected to said platform and to a pressurizing gas source, to move said platform to said second position.

8. The method of claim 5 further comprising providing a chamber for said aqueous solution and providing a pressurizing medium to said chamber to pressurize said aqueous solution in said chamber and to propel said aqueous solution upwardly into said cored hole.

9. The method of claim 8 further comprising providing a piston connected to said platform and to a pressurizing gas source, to move said platform to said second position.

* * * * *